(No Model.)
W. G. GRAY.
CORN PLANTER.
No. 287,121. Patented Oct. 23, 1883.
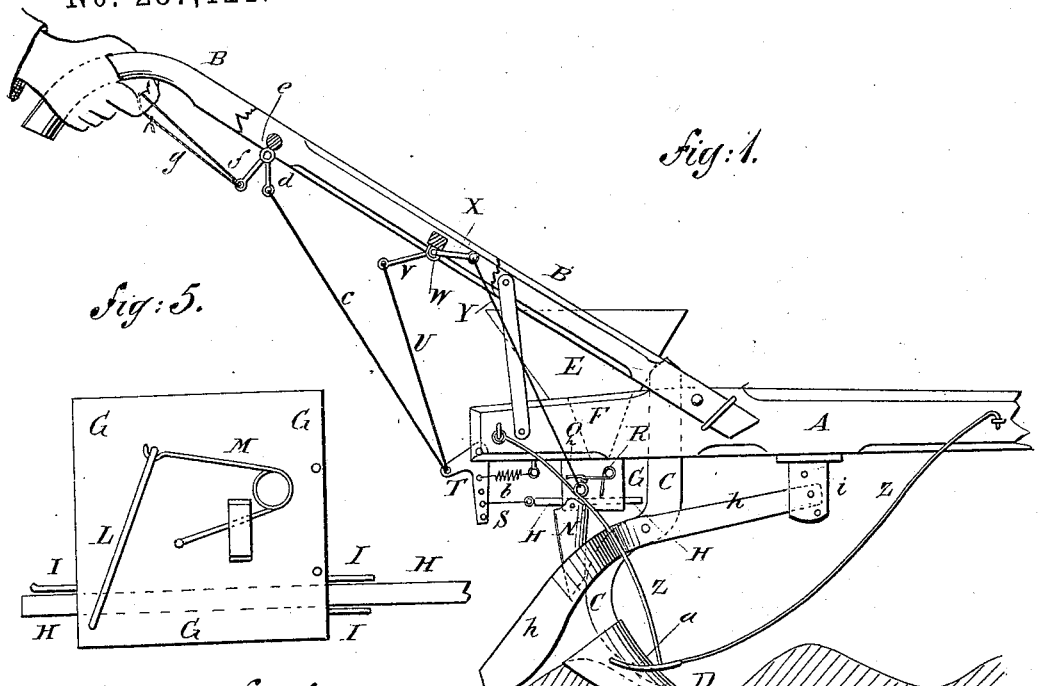
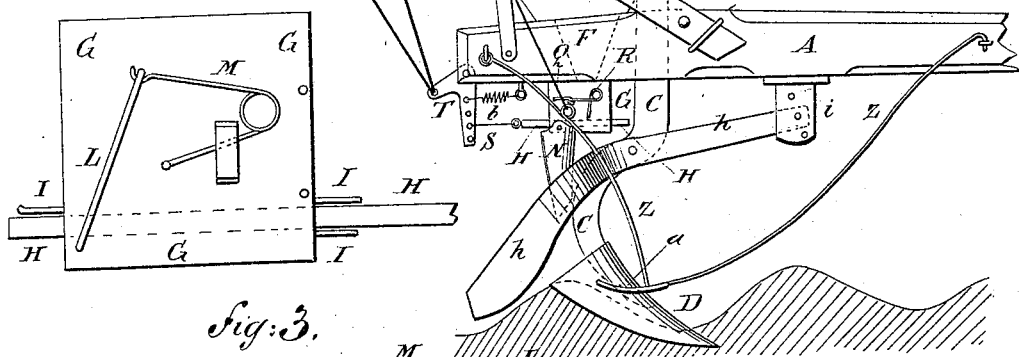
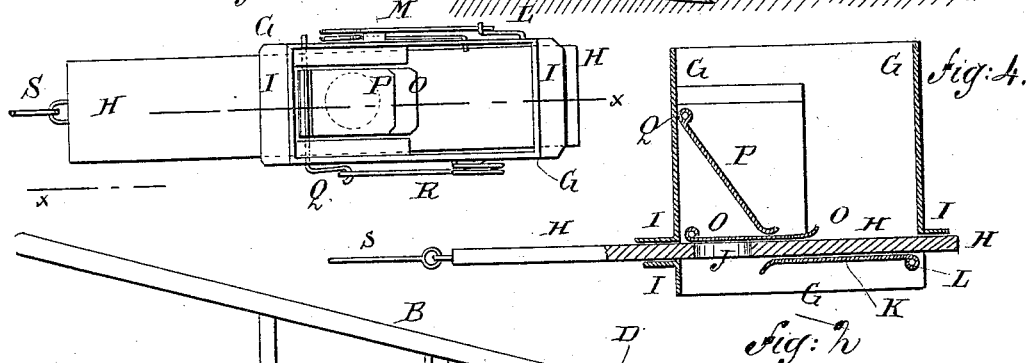
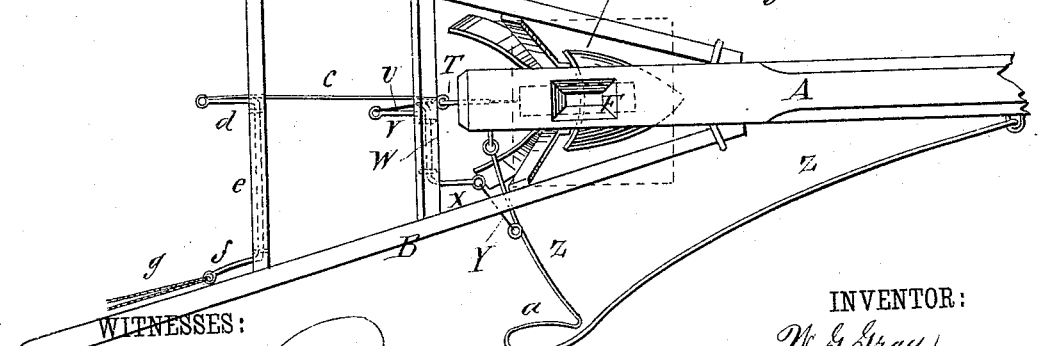
WITNESSES:
Chas. Nied
C. Sedgwick
INVENTOR:
W. G. Gray
BY Munn & Co
ATTORNEYS.

UNITED STATES PATENT OFFICE.

WALTER G. GRAY, OF RINGGOLD, TENNESSEE, ASSIGNOR TO HIMSELF AND WILLIAM H. BURGESS, OF SAME PLACE.

CORN-PLANTER.

SPECIFICATION forming part of Letters Patent No. 287,121, dated October 23, 1883.

Application filed April 13, 1883. (No model.)

*To all whom it may concern:*

Be it known that I, WALTER G. GRAY, of Ringgold, in the county of Montgomery and State of Tennessee, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1 is a side elevation of my improvement. Fig. 2 is a plan view of the same, shown with the hopper removed. Fig. 3 is a plan view of the seed-dropping box and its attachments. Fig. 4 is a sectional side elevation of the same, taken through the line $x\ x$ Fig. 3. Fig. 5 is an elevation of the same, taken from the near side of the planter.

The object of this invention is to facilitate the planting of corn and other seeds.

The invention consists in a corn-planter constructed with a seed-receiving box having a seed-dropping slide, and provided with spring-pressed plates for controlling the removal of seed from the said box. With the seed-dropping slide is connected an elbow-lever, a spring, a crank-shaft, a bent hinged bar, and their connecting-rods, whereby the seed will be dropped by the descent of the said hinged bar into a cross-furrow. With the seed-dropping slide, the elbow-lever, and the spring are also connected a crank-shaft, a connecting-rod, and a cord, whereby the seed can be dropped by hand, as will be hereinafter fully described.

A represents the beam, and B the handles, of an ordinary plow-stock.

C is the standard, to which the plow-plate D is attached in the ordinary manner.

To the upper side of the beam A, between the handles B, is attached a hopper, E, the discharge-passage from which is an aperture, F, through the plow-beam A, as shown in Fig. 2, and indicated in dotted lines in Fig. 1.

To the lower side of the beam A, directly beneath the aperture F, is attached a small box, G, the top of which is open to allow the seed to pass into it freely through the aperture F. The bottom of the box G is formed by the seed-dropping slide H, which passes through apertures in the lower part of the ends of the said box, the said apertures being provided with flanges I, as shown in Figs. 3, 4, and 5, to form bearings for the said slide and lessen the friction and wear.

In the seed-dropping slide H is formed an aperture, J, to receive seed, carry it out of the box G and drop it to the ground, and which is made of such a size as to contain enough seed for a hill.

To the forward part of the sides of the box G, and just below the slide H, is pivoted the forward end of the plate K by the crank-rod L, to which the plate K is rigidly attached, and with the crank of which is connected the spring M, attached to the side of the box G, so that the tension of the said spring will hold the plate K against the lower side of the slide H, and detain the seed within the aperture J until the said aperture is over the spout N, which is attached to the rear part of the box G, and through which the seed is conducted to the ground in the rear of the plow D.

To the rear part of the sides of the box G, and just above the slide H, is pivoted the rear end of the plate O, which rests upon the slide H, and covers the aperture J while the seed for a hill is escaping from the said aperture. The free ends of the plates K O are slightly curved away from the slide H, as shown in Fig. 4, to prevent them from injuring any kernels of seed with which they may come in contact, and to prevent them from wearing the said slide.

Upon the forward part of the upper side of the hinged plate O rests the forwardly-curved lower end of the inclined plate P, the rear end of which is rigidly attached to the crank-rod Q. The rod Q is pivoted to the upper part of the sides of the box G, and close to the rear end of the said box. With the crank of the rod Q is connected the spring R, attached to the side of the box G. With this construction the plate O will be held down upon the slide H with a spring-pressure, so that the said plate can rise should a kernel of grain come between the end of the said plate and the forward side of the aperture J, to prevent the said kernel from being crushed. The plate P also serves as a guard to relieve the plate O from the weight of the seed in the box G, and as a guide to direct the seed to the forward part of the box G, so that it will readily enter the aperture J of the slide H. The plates K O are made of such a length that their inner ends will overlap, as shown in Fig. 4, so that the opening J will always be covered upon one or the other side of the slide H to secure accuracy in dropping the seed.

To the rear end of the said dropping-slide H is attached the end of a short rod, S, the other end of which is attached to the lower arm of the elbow-lever T. Several holes are formed in the lower arm of the lever T, to receive the end of the rod S, so that the throw of the slide H can be readily regulated, as required, by moving the end of the said rod S from one to another of the said holes. The lever T is pivoted at its angle to the rear end of the plow-beam A, and to the end of its other arm is attached the lower end of the rod U, the upper end of which is pivoted to the end of the rearwardly-projecting arm V of the shaft W. The shaft W works in bearings attached to a round of the handles B, and is provided at its right-hand end with a forwardly-projecting arm X, to the end of which is pivoted the upper end of the rod Y. The lower end of the rod Y is hinged to the rear arm of the bar Z, at a little distance from its rear end. The bar Z is hinged at its rear end to the side of the rear end of the plow-beam A, projects downward and outward, is bent forward, is slightly curved upward, and its forward end is hinged to the side of the forward part of the plow-beam A. The bar Z at its angle is bent to form a foot, a, or has a foot, a, otherwise formed upon or attached to it, to slide upon the surface of the ground. With this construction, as the machine is drawn across a field marked with cross-furrows, the foot a of the hinged bar Z will drop into the said cross-furrows successively, and at each downward descent of the said bar Z its weight will operate, by means of the rods Y U, crank-shaft W, and elbow-lever T, the seed-dropping slide H and drop the seed for a hill. As the foot of the bar Z rises each time out of the furrow, the elbow-lever T is operated to force the seed-dropping slide H forward to receive seed for another hill by a spring, b, connected at one end with the lower arm of the said lever and at its other end with the plow-beam A.

To the end of the rear arm of the elbow-lever T is hinged the lower end of a rod, c, the upper end of which is hinged to the end of an arm d, formed upon the shaft e. The shaft e rocks in bearings attached to a round of the handles B, and upon its other end is formed, or to it is attached, an arm, f, to the end of which is attached a looped cord, g, of such a length that the plowman can pass his finger through the loop of the cord, and by pulling upon the said cord can operate the elbow-lever T and draw back the slide H to drop the seed. The seed is covered by the covering-blades h, the shanks of which are pivoted to the opposite sides of the standards C. The shanks of the blades h are extended forward, and their forward ends are pivoted to the opposite sides of a hanger, i, attached to the under side of the plow-beam A. Several holes are formed in the hanger i to receive the fastening-bolt, so that the covering-blades can be readily adjusted to cover the seed to any desired depth.

Having thus fully described my invention, I claim as new and desire to secure by Letters Patent—

1. A corn-planter constructed substantially as herein shown and described, and consisting of the seed-receiving-box G and the seed-dropping slide H, the spring-pressed stop and cut-off plates K O P, and a mechanism for operating the said seed-dropping slide, as set forth.

2. In a corn-planter, the combination, with the seed-receiving box G and the seed-dropping-slide H, of the plates K O P, the crank-rods L Q, and the springs M R, substantially as herein shown and described, whereby the removal of seed from the said box is controlled, as set forth.

3. In a corn-planter, the combination, with the plow-beam A, the handles B, and the seed-dropping slide H, of the elbow-lever T, the crank-shaft W, the bent trip-rod Z, the connecting-rods S U Y, and the spring b, substantially as herein shown and described, whereby the seed will be dropped by the descent of the said trip-rod into a cross-furrow, as set forth.

4. The loop-cord g and the two elbow-levers d e f and T, connected by a cord, c, in combination with the dropper-slide H, as shown and described.

WALTER GILLEM GRAY.

Witnesses:
R. D. MASSEY,
M. W. WEST.